INVENTOR
C. PRACHAR

July 11, 1961 C. PRACHAR 2,991,864
AUTOMATIC CLUTCH DEVICE FOR AUTOMOBILE VEHICLES
Filed Oct. 1, 1956 4 Sheets-Sheet 4

INVENTOR
C. PRACHAR

BY *Wenderoth, Lind & Ponack*
ATTYS.

United States Patent Office 2,991,864
Patented July 11, 1961

2,991,864
AUTOMATIC CLUTCH DEVICE FOR AUTOMOBILE VEHICLES
Cyril Prachar, 53 rue Censier, Paris, France
Filed Oct. 1, 1956, Ser. No. 613,190
Claims priority, application France Oct. 5, 1955
3 Claims. (Cl. 192—90)

The present invention relates to an automatic clutch for automobile vehicles and relates more particularly to a clutch of the type having a centrifugal device controlling engagement of the clutch at starting and disengagement of the clutch, that is de-clutching, when the speed of the engine falls below a predetermined value, the necessary de-clutching for gear change operation being controlled by the gear change lever.

Known automatic clutches of this type comprise an electromagnetic device for de-clutching during gear change operation and a pressure plate which is axially movable on the driven shaft and which, during clutch engagement, forces a friction disc against a reaction disc coupled to the driving shaft. Such known clutches however have the disadvantage that they are of relatively complicated and costly construction due to the fact that disengagement of the clutch by the electromagnetic device is effected by displacement of the assembly comprising the centrifugal device and the pressure plate.

The device according to the present invention obviates the aforesaid disadvantage and is characterized by the fact that the friction disc is disposed between a pressure plate forced against the friction disc by a centrifugal device acting against the action of return springs, and a second pressure plate maintained against the friction disc by clutch springs and adapted to be removed from the said disc by an electromagnet during gear change operation, the windings of the electromagnet being arranged in the flywheel of the engine and the second pressure plate forming the armature.

The centrifugal device according to the invention preferably consists of a plate which performs the function of the pressure plate and which is provided with radial apertures in its periphery, the radial apertures housing balls performing the function of centrifugal masses. The radial apertures extend partially into a bevel formed on the rear edge of the plate and the balls bear on the conical internal surface of a dished member disposed behind the plate.

According to one modification, the pressure plate has, opposite the conical surface of the said dished member, a shoulder on which the balls are disposed side-by-side.

Embodiments of the invention are hereinafter described by way of example with reference to the accompanying drawings, in which.

Figure 1:
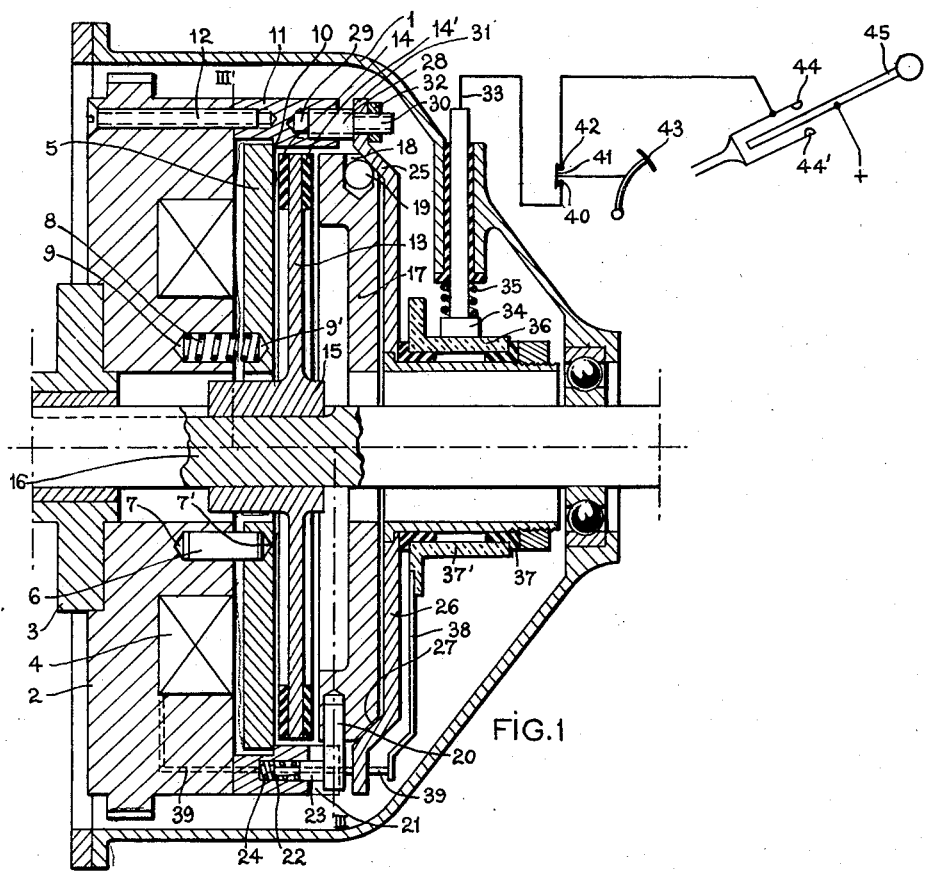
FIGURES 1 and 2 show diagrammatically in axial sectional elevation and in cross-section, one form of automatic clutch according to the invention.

As shown in FIG. 1 the clutch assembly, including a centrifugal device and an electromagnetic device, is arranged within a casing 1. The clutch comprises a flywheel 2 secured to a driving shaft 3, and the windings 4 of the clutch release electromagnet are mounted in a recess in the flywheel. The armature of the electromagnet comprises a plate 5 arranged to be axially movable and to rotate integrally with the flywheel 2 by means of a number of rods, such as 6, 6' engaged in aligned apertures 7, 7' formed in the flywheel 2 and in the plate 5 respectively. Springs 8 arranged in apertures 9, 9' similar to the apertures 7, 7' bias the plate 5 to the right against an abutment 10 formed by an internal shoulder on a cylindrical sleeve 11 fixedly mounted on the flywheel 2 by means of screws 12. The sleeve 11 is made of non-magnetic metal, preferably of duralumin, so that the magnetic circuit of the electromagnet 2—4 is closed only by the armature 5. The plate 5 serves a support or reaction plate for a clutch disc 13 provided with friction linings 14, 14', the hub 15 of the disc 13 being slidably keyed on a driven shaft 16. A centrifugal pressure plate 17 is mounted on the other side of the friction disc 13 and is formed with radial apertures 18 housing balls 19, the said plate 7 being arranged to rotate integrally with the flywheel 2 by means of radial pins 20 engaged in slots 21 in the cylindrical sleeve 11 fixedly mounted on the flywheel. The sleeve 11 is also provided with longitudinal apertures 22 housing pistons 23 which are forced against the pins 20 by springs 24. The balls 19 bear against the conical internal surface 25 of a dished member 26 arranged immediately behind the plate 17, and the rear edge of the plate 17 is provided with a bevel 27 conforming to said surface 25, the apertures 18 extending out through the bevel 27. The dished member 26 is secured to the sleeve 11, and hence to the flywheel 2, by means of a device for taking up play to compensate for the wear on the friction members of the clutch. The fixing means employed for this purpose are bolts comprising a screwthreaded stem, of which one part 28 has a relatively large diameter and is engaged in screwthreaded holes 29 formed in the sleeve 11, and another part 30, which is of smaller diameter, extends through apertures formed in the plane outer edge 31 of the dished member 26, which is secured in position against the shoulder of the bolts 28—30 by a nut 32. The dished member 26 may be thus moved towards the clutch disc 13 by merely slackening the nuts 32, screwing the bolts 28—30 further into the screwthreaded holes 29 in the sleeve 11 and then re-tightening the nuts 32. The windings 4 of the clutch release electromagnet are fed from an electric battery by means of a conductor 33 connected to a brush 34 which is biased by a spring 35 against a conducting sleeve 36 secured to the dished member 26 and electrically insulated therefrom by insulating rings 37, 37'. The sleeve 36 supports a conducting blade 38, and an insulated conductor 39 which is welded to the blade 38 passes through appropriate apertures formed in the sleeve 11 and the flywheel 2 and is connected to the windings 4.

The circuit of the electromagnet is controlled on the one hand by a movable blade 41 co-operating with two fixed contacts 40, 42, and the contact 40—41—42 is closed only when the accelerator pedal 43, to which the movable blade 41 is connected, is inoperative. The said circuit is in addition controlled by the contacts 44, 44', one of which is closed as soon as the driver touches the gear change lever 45.

This device operates as follows:

When starting the engine of the vehicle, the lever 45 is in the neutral position, and the electromagnet 4, 5 is not energized, so that the springs 8 force the armature 5 to the right against the abutment 10. As soon as the speed of rotation of the driving shaft and consequently of the centrifugal pressure plate 17 reaches a sufficiently high value, the balls 19 are thrown out against the conical surface 25 of the dished member 26 and force the pressure plate 17 to the left. The movement of the pressure plate 17 to the left clamps the friction linings 14, 14' of the clutch disc 13 between the plate 17 and the reaction plate consisting of the armature 5 of the electromagnet, thus effecting engagement of the clutch. For gear change operation, the electromagnet 4 is energized through the contact 44, 44′ actuated by the gear change lever 45, and attracts the armature 5 to the left, so that the clutch disc 13 is separated from the plate 5. At the end of the gear change operation, the electromagnet 4 is de-energized again and the springs 8 return the plate 5 into contact with the disc 13, thus effecting reengagement of the clutch.

Figure 3:
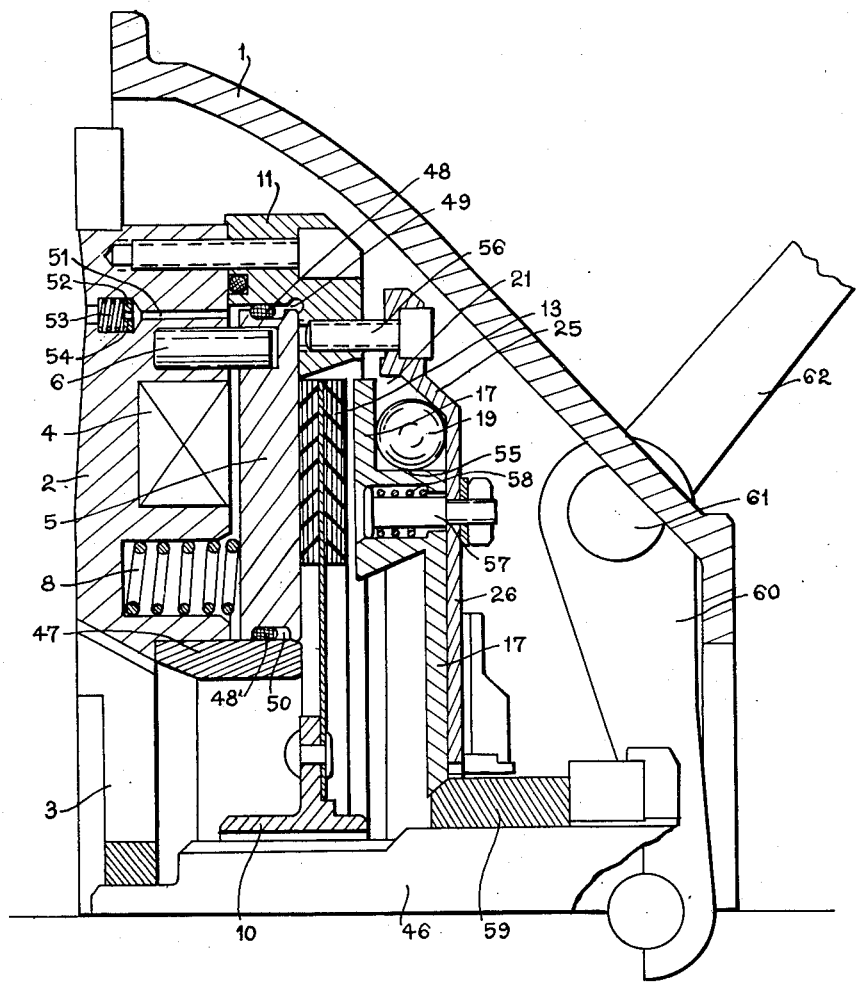
FIGURE 3 is an axial section on a larger scale showing some important constructional details of another form of clutch according to the invention.

FIGURE 3, which shows another form of clutch according to the invention, illustrates a number of improvements in the form of clutch described in the foregoing.

Figure 2:
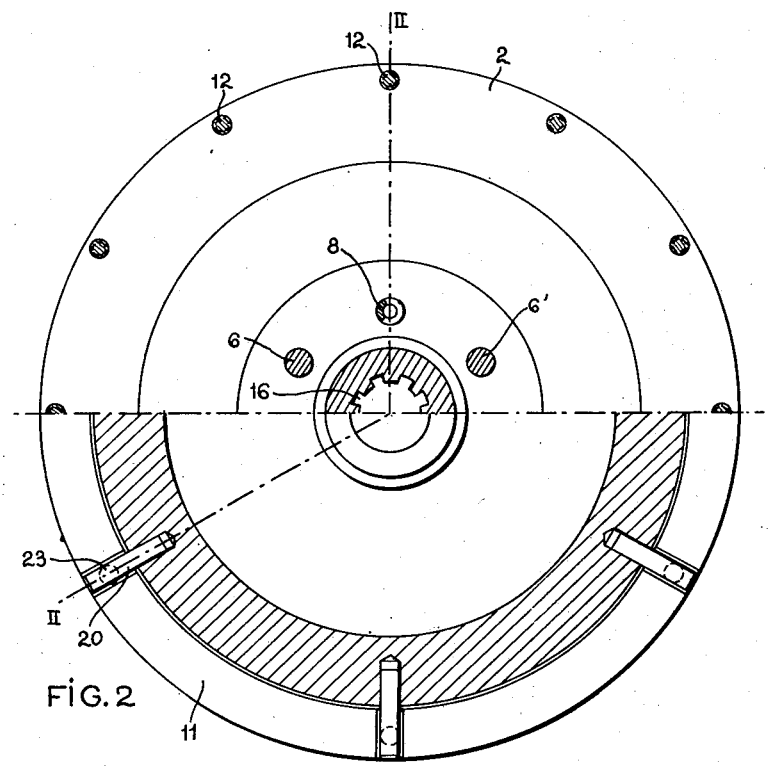

As will be seen from FIGURE 3, the clutch like that of FIGURES 1 and 2, is enclosed within a casing 1 and comprises a flywheel 2 secured to the driving shaft 3, and the windings 4 are mounted in a recess in the flywheel and are fed by the battery of the vehicle through a relay (not shown), the closing of which is controlled by the charging current supplied by the engine dynamo. The circuit of the clutch release electromagnet 3—4 is in addition controlled, as described in the foregoing, by a switch which is maintained in the open position by the accelerator pedal as long as it is actuated. Thus, the gear change levers can move only when the accelerator pedal is completely raised, which prevents racing of the motor during the gear changing, without preventing racing of the engine when the gear change lever is in the neutral position. In addition, the breaking of the circuit of the electromagnet by the switch actuated by the accelerator pedal, in contrast to what takes place in the majority of electromagnetic clutch release devices, permits keeping the hand on the gear change lever during running without the contact controlled by the gear change lever immediately disengaging the clutch.

A duralumin ring 11 is fixedly mounted on the flywheel 2, as in the clutch of FIGS. 1 and 2, and the pressure plate 5 forms the armature of the electromagnet, the said plate 5 being rotated with the flywheel by means of rods 6 slidably mounted in blind holes 7 in the plate 5. The plate 5 is urged against the friction disc 13 by the clutch engagement springs 8, and the disc 13 is provided in the usual manner with a hub 15 slidably mounted on the driven shaft 46. The armature plate 5 is of annular form and is internally guided by a ring 47 concentric with the ring 11. In order to produce progressive disengagement of the clutch, the movements of the plate 5 are damped by the following means. On the one hand, the plate 5 is guided in the concentric rings 11 and 47 by toroidal rubbers packings 48, 48′, preferably of circular cross-section, which are lodged in grooves 49, 50 formed in the outer and inner edges of the plate 5. The grooves 49, 50 are wider than the packings so as to permit the latter to roll during the movements of the plate and thus to limit the wear thereon. On the other hand, the air-filled gap between the plate 5 and the flywheel 2 communicates with the atmosphere through an aperture 51 of small cross-section, within which there is arranged a discharge valve having a valve member 52 loaded by a spring 53 and formed with a calibrated orifice 54. The return movement of the plate 5 during de-clutching is thus braked by the compression of the air in the gap between the plate 5 and the flywheel, while the clutch engaging movement is braked by the negative pressure produced in the said gap by reason of the pressure reduction due to the low rate of admission of air through the calibrated orifice 54 in the valve member 52.

As in FIGS. 1 and 2, the centrifugal clutch engaging device is situated to the rear of the friction disc 13 and comprises a pressure plate 17 having a circular cut-away shoulder 55, in which there are freely juxtaposed the balls 19 bearing on the internal conical surface 25 of the dished member 26. The member 26 is secured to the ring 11 by bolts 56 and the plate 17 is coupled to the member 26 for rotation therewith, by bolts 57 provided with springs 58 which urge the plate 17 to the right away from the friction disc 13. The balls 19 as described with reference to the clutch of FIGS. 1 and 2 urge the plate 17 to the left into engagement with the disc 13 as soon as a sufficiently high speed is reached. The pressure plate 17 can be locked in the engaged position by an abutment 59 even when the engine is not running, for example in order to hold the vehicle on a slope or to permit starting of the engine by pushing the vehicle.

The abutment 59 is slidably mounted on the shaft 46 and can be moved to the left by a fork 60 keyed on a pin 61. A lever 62 is secured to the pin 61 and can be operated by the driver with the aid of a further lever, a pull member or a pedal, either through a cable or rod system.

The duralumin ring 11 is provided with radial apertures positioned opposite the friction disc 13, the apertures 21 (FIG. 1) being drilled or cut in such a manner as to provide a strong ventilation, more especially for discharging the dust produced by wear on the friction disc.

Figure 4:
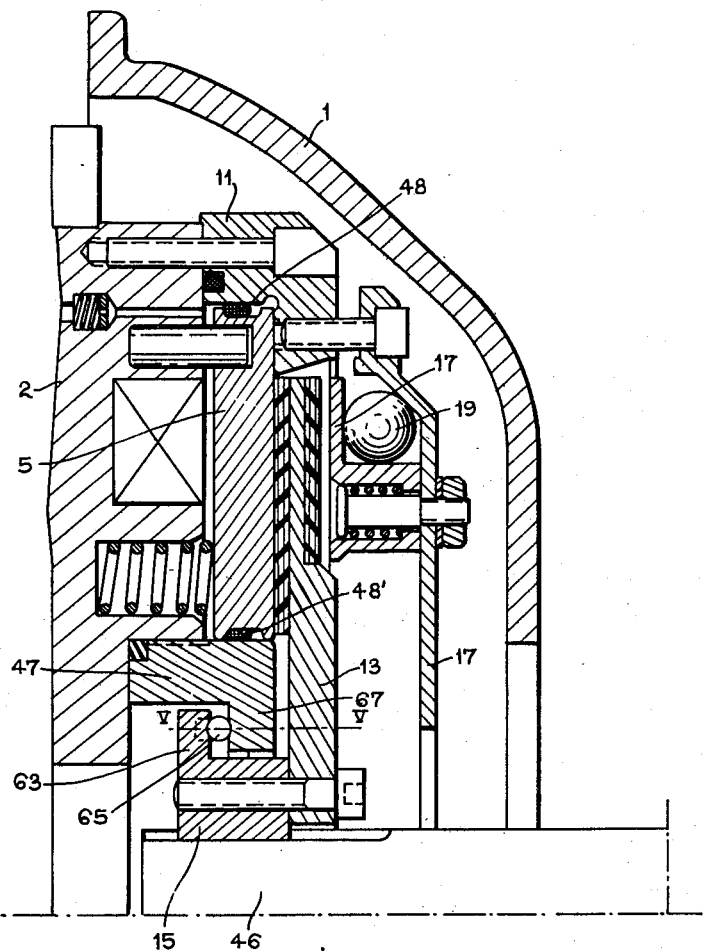
FIGURES 4 and 5 show details of a modified form of the clutch of FIG. 3.
Figure 5:
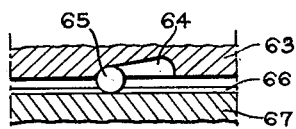

The clutch of FIG. 4 is a modified form of the clutch of FIG. 3 and is provided with a free wheel or overrun device which automatically locks the clutch in the engaged position to enable the vehicle to be held fast on a slope or to permit braking by means of the engine, even if the gear changing operation into the lower gears is effected sufficiently slowly for the engine to return to the slow running speed and thus produce disengagement of the centrifugal device. The free wheel is disposed between the flywheel 2 and the hub 15 of the friction disc and comprises a plurality of balls 65 arranged between a flange 63 on one end of the hub 15 and a flange 67 on an end of the cylindrical ring 47. The balls are located in recesses 64 in the inner face of flange 63 and engage in a circular groove 66 formed in the adjacent face of the flange 67. The bases of the recesses 64 are inclined with respect to the inner face of flange 63, as shown in FIG. 5, and the direction of inclination is chosen so that when the engine, together with the flywheel 2, tends to turn more rapidly than the driven shaft 46, the balls 65 tend to enter the deeper portions of the recesses 64 and produce no coupling between the flanges 63 and 67, but when the shaft 46 tends to turn more rapidly than the engine, the balls 65 tend to take up position in the shallower portions of the recesses 64, as illustrated in FIGURE 5, and couple the driving shaft to the driven shaft by the wedging action of the balls 65 between the flanges 63 and 67.

What I claim is:

1. In an electromagnetic clutch for automobile vehicles automatically controlled by the change gear lever the combination comprising a driving shaft, a driven shaft, a thick circular plate fly-wheel of magnetic material, a starter gear on the periphery of said fly-wheel rotating with said driving shaft, said fly-wheel having an annular groove on the inner face thereof, a winding arranged inside said groove, a dish shaped member loosely mounted on said driven shaft having a tapered marginal part and its outer edge rigidly fixed to the edge of said fly-wheel, a friction disc slidably arranged on said driven shaft between said fly-wheel and dish shaped member, a first pressure plate of magnetic material axially movable relative to said driven shaft between said fly-wheel and said friction disc, spring means arranged between said fly-wheel and said first magnetic pressure plate to apply said plate against said friction disc when said winding is not energized to form an air-gap between said fly-wheel and pressure plate, an inner cylindrical sleeve fixed on the inner face of said fly-wheel, a second sleeve fixed coaxial to said first sleeve on the edge of said fly-wheel, said first pressure plate forming the movable armature of said electromagnet being of annular shape provided with an outer and inner circular edge and axially guided between both said coaxial sleeves, two packings formed by rubber rings being interposed between said sleeves and the outer and inner edge of said first plate respectively, said fly-wheel having a bore therein to connect the atmosphere with the air-gap between said fly-wheel and said first plate, and a discharge valve arranged in said bore, whereby the displacements of said plate are damped by the compression and the pressure reduction of the air in said gap, a second pressure plate loosely arranged on said driven shaft between said friction disc and said dish shaped member mounted to rotate therewith, spring means to push said second pressure plate towards said dish shaped member, centrifugal masses comprising a circular row of balls, means freely supporting said balls by said second pressure plate facing said tapered marginal part of said dish shaped member whereby reaction on said tapered marginal part of said dish shaped member causes said balls to apply said second pressure plate against said friction disc when the speed of said driving shaft exceeds the idling speed.

2. In an electromagnetic clutch for automobile vehicles automatically controlled by the change gear lever the combination comprising a driving shaft, a driven shaft, a thick circular plate fly-wheel of magnetic material, a starter gear on the periphery of said fly-wheel rotating with said driving shaft, said fly-wheel having an annular groove on the inner face thereof, a winding arranged inside said groove, a dish shaped member loosely mounted on said driven shaft having a tapered marginal part and its outer edge rigidly fixed to the edge of said fly-wheel, a friction disc slidably arranged on said driven shaft between said fly-wheel and dish shaped member, a first pressure plate of magnetic material axially movable relative to said driven shaft between said fly-wheel and said friction disc, spring means arranged between said fly-wheel and said first magnetic pressure plate to apply said plate against said friction disc when said winding is not energized to form an air-gap between said fly-wheel and pressure plate, a first inner cylindrical sleeve fixed on the inner face of said fly-wheel, a second sleeve fixed coaxial to said first sleeve on the edge of said fly-wheel, said first pressure plate forming the movable armature of said electromagnet being of annular shape provided with an outer and inner circular edge and axially guided between both said coaxial sleeves, said first plate having annular grooves in the two outer and inner edges thereof, rubber packing rings disposed in said grooves and compressed between said sleeves and the bottom of said grooves which have a width greater than the diameter of the section of the packing rings so as to permit the latter to roll in said grooves during axial movement of said first plate, said fly-wheel having a boring therethrough to connect the atmosphere with the air-gap between said fly-wheel and said first plate, and a discharge valve arranged in said boring, whereby the displacements of said first plate are damped by the compression and the pressure reduction of the air in said gap, a second pressure plate loosely arranged on said driven shaft between said friction disc and said dish shaped member mounted to rotate therewith, spring means to push said second pressure plate towards said dish shaped member, centrifugal masses comprising a circular row of balls, means freely supporting said balls by said second pressure plate facing said tapered marginal part of said dish shaped member whereby reaction on said tapered marginal part of said dished shaped member causes said balls to apply said second pressure plate against said friction disc when the speed of said driving shaft exceeds the idling speed.

3. In an electromagnet clutch for automobile vehicles automatically controlled by the change gear lever the combination comprising a driving shaft, a driven shaft, a thick circular plate fly-wheel of magnetic material; a starter gear on the periphery of said fly-wheel rotating with said driving shaft, said fly-wheel having an annular groove on the inner face thereof, a winding arranged inside said groove, a dish shaped member loosely mounted on said driven shaft having a tapered marginal part and its outer edge rigidly fixed to the edge of said fly-wheel, a friction disc slidably arranged on said driven shaft between said fly-wheel and dish shaped member, a first pressure plate of magnetic material axially movable relative to said driven shaft between said fly-wheel and said friction disc, spring means arranged between said fly-wheel and said first magnetic pressure plate to apply said plate against said friction disc when said winding is not energized, a second pressure plate loosely arranged on said driven shaft between said friction disc and said dish shaped member mounted to rotate therewith, spring means to push said second pressure plate towards said dish shaped member, centrifugal masses comprising a circular row of balls, means freely supporting said balls by said second pressure plate facing said tapered marginal part of said dish shaped member whereby reaction on said tapered marginal part of said dish shaped member causes said balls to apply said second pressure plate against said friction disc when the speed of said driving shaft exceeds the idling speed, a movable abutment slidably mounted on said driven shaft operatively connected with said second plate, and actuating means provided to lock the clutch in the engaged position by pushing said movable abutment and said second pressure plate towards said friction disc.

References Cited in the file of this patent

UNITED STATES PATENTS

| | | |
|---|---|---|
| 928,482 | Turner | July 20, 1909 |
| 1,823,334 | Payne | Sept. 15, 1931 |
| 2,139,350 | Barnes | Dec. 6, 1938 |
| 2,451,109 | Nardone | Oct. 12, 1948 |
| 2,484,138 | Winther | Oct. 11, 1949 |
| 2,531,711 | Thomas | Nov. 28, 1950 |
| 2,591,989 | Winther | Apr. 8, 1952 |
| 2,625,413 | Christensen | Jan. 13, 1953 |
| 2,688,388 | Gill | Sept. 7, 1954 |
| 2,724,474 | Hupp | Nov. 22, 1955 |
| 2,746,585 | Binder | May 22, 1956 |
| 2,760,615 | Kershner | Aug. 28, 1956 |

FOREIGN PATENTS

| | | |
|---|---|---|
| 402,675 | Germany | Sept. 18, 1924 |
| 616,280 | France | Oct. 26, 1926 |
| 556,182 | Great Britain | Sept. 23, 1943 |